United States Patent
Truemner et al.

[11] Patent Number: 5,598,462
[45] Date of Patent: Jan. 28, 1997

[54] TELECOMMUNICATIONS NETWORK ROUTING

[76] Inventors: Michael A. Truemner, 9809 W. 118th St., #1, Overland Park, Kans. 66210; Jeffery B. Mosley, Rte. 2, Box 227A, Peculiar, Mo. 64078

[21] Appl. No.: 951,243

[22] Filed: Sep. 25, 1992

[51] Int. Cl.⁶ .................................................. H04M 11/00
[52] U.S. Cl. ............................. 379/95; 379/98; 379/216
[58] Field of Search .......................... 379/91, 216, 127, 379/93, 95, 96–99, 144, 357

[56] References Cited

U.S. PATENT DOCUMENTS

| | | | |
|---|---|---|---|
| 4,162,377 | 7/1979 | Mearns | 378/127 |
| 4,741,026 | 4/1988 | Baxter et al. | 379/204 |
| 4,756,020 | 7/1988 | Fodale | 379/127 |
| 4,757,267 | 7/1988 | Riskin | 379/97 |
| 4,796,292 | 1/1989 | Thomas | 379/91 |
| 4,922,522 | 5/1990 | Scanlon | 379/95 |
| 4,924,495 | 5/1990 | Richards et al. | 379/127 |
| 5,023,868 | 6/1991 | Davidson et al. | 370/62 |
| 5,023,904 | 6/1991 | Kaplan et al. | 379/91 |
| 5,095,505 | 3/1992 | Finucane et al. | 379/127 |
| 5,144,651 | 9/1992 | Cooper | 379/216 |
| 5,163,086 | 11/1992 | Ahearn et al. | 379/91 |
| 5,184,345 | 2/1993 | Sahni | 379/93 |
| 5,307,402 | 4/1994 | Cooper | 379/96 |

*Primary Examiner*—Jeffery Hofsass
*Assistant Examiner*—Daniel J. Wu
*Attorney, Agent, or Firm*—Harley R. Ball; Michael J. Setter

[57] ABSTRACT

The present invention is a method of establishing telecommunications between a communication device and a predetermined destination by way of a telecommunications network. The network has at least a first network and a second network, wherein the first network establishes communications between a communications device and a second network. The steps provide for configuring the device to be activatable for transmitting a predetermined string associated with the second network, activating the device to transmit the predetermined string, and in response, establishing communication between the device and the second network. Information is received into the second network from the first network associated with the identity of the communication device, and, in response, retrieving data comprising a destination number previously stored in association with the device information, and establishing the communication with the destination in accordance with the retrieved destination number.

17 Claims, 2 Drawing Sheets

TELECOMMUNICATIONS NETWORK ROUTING

BACKGROUND OF THE INVENTION

1. Field of the Invention

The present invention is concerned with the field of telecommunications and, more particularly, with reducing the time required for transactions between a communication device and a destination.

2. Description of the Prior Art

Various communication devices exist for communication with certain offices and apparatus over communication lines. For example, lottery devices provide communication with centralized computers, and credit card transaction terminals typically provide a mechanism for retailers to obtain approval, i.e., validation, before processing a transaction exceeding a specified dollar amount. In order to make the validation process more convenient, the credit card transaction terminal establishes communication with a specified validation computer over telephone lines.

For example, when a transaction requires approval, a salesclerk enters the dollar amount of the transaction into the terminal and then swipes the card through the terminal which reads pertinent card information encoded on the magnetic strip. This information includes the type of card and the card number. The clerk then activates the "enter" button on the terminal whereupon the terminal dials a toll-free "800" number associated with the destination of the designated validation computer. The local exchange carrier (LEC) accesses a database to translate the NPA-NXX portion of the dialed number to determine which interexchange carrier (IC) has been engaged to handle the transaction. This process takes between 1.5 and 3.0 seconds.

Upon identifying the proper IC, the LEC asks the IC for a an open trunk line to the point-of-presence switch of the IC and, upon connecting with the open trunk line, outpulses data to the switch. This data includes automatic number identification (ANI) of the calling number and also includes the called number. This portion of the process takes an additional 3.9 to 5.1 seconds.

Upon receiving the outpulse data from the LEC, the IC switch must then translate the dialed 800 number into a normal ten digit destination. This is achieved by accessing the remote database which requires about 1.0 second. Upon receipt of the translated number, the IC switch then routes the call to the destination whereupon the validation computer is placed in communication with the card terminal. As can be appreciated, the setup process can take anywhere from 6.4 to 9.1 seconds after the enter button is activated on the terminal. On top of this, additional time is required for the validation process which must be completed before the terminal can indicate whether the transaction is approved.

A similar process may occur in other applications and transactions, such as operator assisted telephone calls such as from pay phones. In pay phones these calls are often serviced by regional operating centers. Therefore when a customer dials a destination number requesting operator assistance, the pay phone may outpulse a number associated with the regional operating center (ROC) associated with that pay phone, often this is an 800 number associated with that ROC. The LEC similarly accesses a database to determine which interexchange carrier has been engaged to handle the call transaction. The LEC then asks the IC for an open trunk and outpulses data to the switch. Upon receiving the data if it is an 800 number the IC switch must translate the dialed 800 number into the normal 10 digit destination of the ROC. The pay-phone call is then routed to the ROC and after a connection is established the ROC will send a signal to the pay-phone and the pay-phone then transmits the desired destination digits. As one can appreciate the set-up time for certain pay-phone transactions can be significant.

In certain transactions the time required for set up of communications may be extremely important. For example, in transactions involving consumers the transaction time can be an irritation to the customer involved and to other customers waiting in line. In addition, in a high volume setting the cumulative effect over many calls can have an adverse impact on the overall efficiency and volume. Further, for a phone company delays in set-up time may impose additional expenses with respect to network costs which may not be recovered from the customer and leads to increased transaction expense. Therefore, one can appreciate that it would be desirable to minimize call set-up time between communication devices and destinations.

In other transactions telecommunication lines are dedicated for a single or dedicated purpose. For example, in some security systems, communication terminals are established on the premises for dialing a number associated with the security agency or other location to be notified. These are typically separate communication lines whose costs are often absorbed by the security agency and are billed to the consumer as part of the security agency's service fee. These separate lines may be expensive and in addition, the security agency may not be able to easily control the destination of the call if these are operated by preset dialing modems at the customer's location. Changing the destination of the call may be desirable if the agency changes offices or locations or desires to consolidate certain destinations. Numerous other applications such as security card access systems, remote utility monitoring could benefit from alternate methods of transactions between a communication device and a remote location.

In some applications IC carriers have established direct access lines (DAL) with customers. These DAL's have authorization codes associated with each line. When a line is unhooked, the switch accesses data stored in tables in local memory associated with such authorization codes for such line. The data contains information on whether this call is to be immediately connected to a destination and the destination to which the line is to be immediately connected. If the data indicates the call is to be immediately connected, the switch establishes communication between the line and the destination provided for in the previously stored data. While this method provides for fast connections, unfortunately it requires a dedicated access line between the subscriber and the IC, which is not economically feasible for many applications and provides no improvement for the many communication lines which are routed through local operating companies.

There have been some limited applications in the past of the use of automatic dialers. Long distance companies installed these dialers on the local line at the customer premise. When the customer dialed a long distance number, these dialers would come off-hook on the local line and dial the long distance phone company access number, such as 472-1930 when using feature group A access or 950-1033 when using feature group B access. The dialer would then wait until a 400 Hz dial tone signal was received and then the dialer would dial a seven or nine digit authorization code and the dialed number. The long distance company then used the dialed authorization code for both authorization and billing purposes. These dialers therefore provided customers with easy access to the long distance networks before equal access was provided. As equal access evolved through feature group D, this feature then allowed direct call delivery without dialing a special access number, in addition to allowing for previous access methods such as allowing the use of an access number. Feature group D also provided long distance companies with automatic number identification (ANI) which provided a preferred means of billing customers versus authorization codes.

SUMMARY OF THE INVENTION

The present invention is a method of establishing telecommunications between a communication device and a predetermined destination by way of a telecommunications network, the network comprising a first network and a second network, wherein the first network establishes communications between a communications device and a second network. The method comprises the steps of configuring the device to be activatable for transmitting a predetermined string associated with said second network, activating the device to transmit said predetermined string, and in response, establishing communication between the device and the second network. The method then provides for the steps of receiving information into said second network from said first network associated with the identity of said communication device, and, in response, retrieving data comprising a destination number previously stored in association with said device information, and then establishing said communication with the destination in accordance with said retrieved destination number.

The invention also comprises a telecommunications network comprising a means for receiving information associated with a the identification of a communication device, a means for accessing data comprising at least one destination number, wherein said data has been previously stored in association with the information received relating to the identification of said communication device, and a means for establishing communications between said device and said destination number.

The invention further comprises a method for utilization of a telecommunications network comprising the steps of connecting at least two communication devices such that the devices are associated with a single telecommunication number, receiving automatically through a telecommunication network information associated with said single number in response to an action by at least one of said two devices; and then retrieving at least one predetermined destination number associated with said single number.

DETAILED DESCRIPTION OF THE PREFERRED EMBODIMENT

Figure 1:
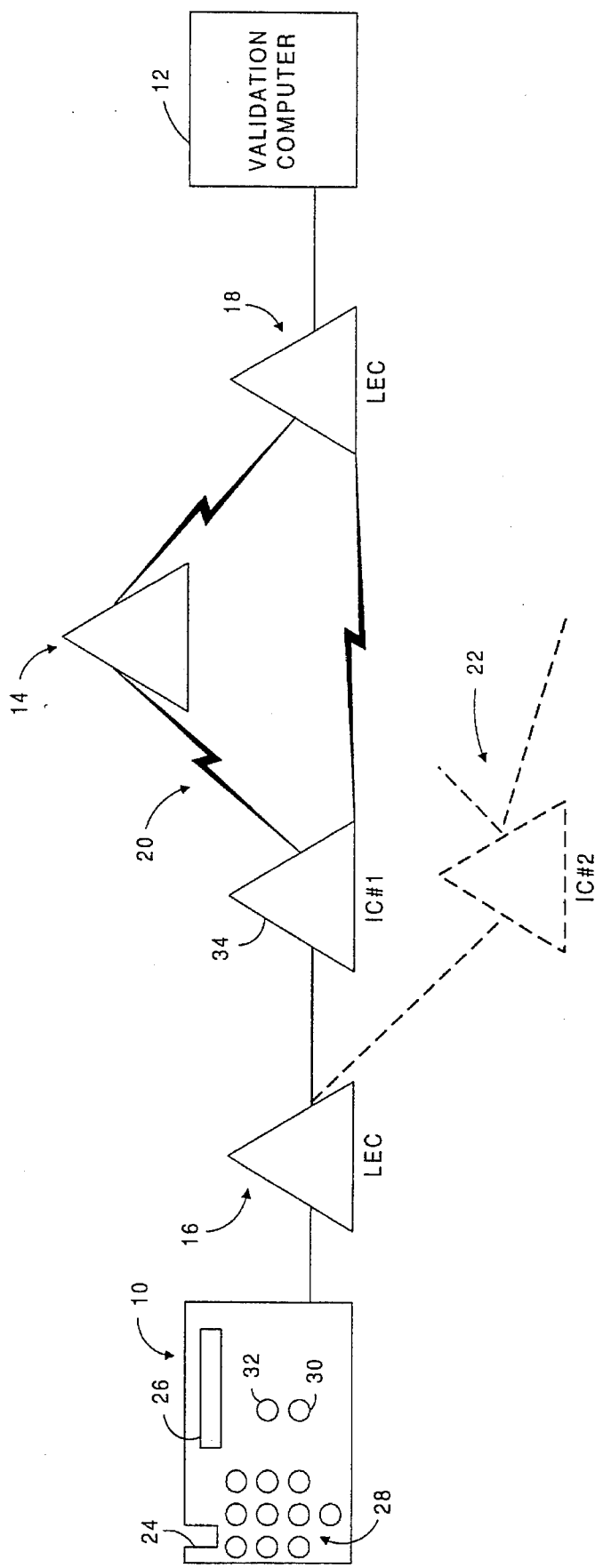
FIG. 1 is a schematic representation of a communication device and a validation computer interconnectable over a telecommunications network.

The drawing figure schematically illustrates communication device 10, a destination 12, and telecommunications network 14. This network may further comprise as first network such as a local exchange carriers (LEC) 16 and 18, and a second communications network such as preferred interexchange carrier (IC) 20, and secondary IC 22.

The communication device 10 may be any type of communication device or terminal which may be connected to a telecommunications network and which is capable of outpulsing or otherwise dialing a number. For example, communication device 10 may be a security terminal, security card access device, utility monitoring device, lottery terminal, payphone or other such device for dialing a number. The device 10 has a means for automatically transmitting to a telecommunications network a predetermined network string of information to select the network to provide telecommunication service for a transaction for the device 10. This means may be any type of means such as a user programmed number which may be altered by the user, or the means may comprise a preset number stored in the device either through hardware or software configurations well known in the art. The device also preferably includes a means for automatically transmitting a predetermined destination string of information to provide information to said network associated with said destination. Typically there is one destination associated with a device, however a single device may have several predetermined destination based on the particular transaction being processed. This means is also implemented through any means for transmitting information either through hardware or software. One such device 10 as depicted may be a point of sale terminal such as for verifying credit card transactions. The point of sale terminal may comprise card slot 24, display 26, transaction amount keypad 28 (digits 0–9 plus decimal point), and "enter" button 30 such as Verifon Tranz 330. Destination 12 may be a validation computer, an operating center or any other such destination to which it is desirable to route information from the communication device 10. IC 20 includes a number of switches and other network components including point-of-presence switch 34.

Additionally, device 10 may comprise button 32 programmed as a "dial" button or other suitable means, when activated, to seize the connected LEC telephone line and dial an IC direct number. This number is also known as a "cut through" number which is in the format 10XXX# where XXX identifies the customer's preferred interexchange carrier 20 such as 333 for the assignee of the present invention. Upon the dialing of a cut through number, a local exchange carrier connects a calling station directly with the point-of-presence IC switch which responds with dial tone. By configuring button 32 to dial a designated cut through number instead of a ten digit number, device 10 is connected directly with an open trunk line of IC 20. This eliminates the need and thus, the time, required for LEC 16 to access a database in order to determine the identity of the preferred carrier from the normally dialed ten digit number.

Device 10 is also preferably programmed to output a predetermined DTMF dialing string directly into IC switch 34 when enter button 30 is activated. This dialing string includes one of a ten digit off-net number, a seven digit on-net number, or a four digit speed number. The ten digit off-net number is a number requiring translation such as an 800 number.

Normally, however, if the destination 12 is a high volume user such as the destination number of a validation computer, the destination 12 would be connected with IC 20 through a virtual private line or other dedicated access channel. If such is the case, the DTMF dialing string could be the seven digit on-net number specific to destination 12. This would eliminate the need, and thus the time, for IC 20 to access a remote database for translation of the dialed number. In order to provide even greater efficiency and time savings, destination computer 12 could be identified by a four digit speed dial number in the DTMF dialing string. In such an event, switch 34 would be programmed to identify the destination on the basis of the speed dial number.

In one embodiment if device 10 is a terminal for verifying credit card transactions, a sales clerk would immediately activate dial button 32 when a customer indicates that the transaction is to be paid by credit card. This activation would occur before entering the amount of the customer's transaction on keypad 28 and before passing the customer's credit card through slot 24. Upon activation of dial button 32, device 10 seizes the telephone line and dials the carrier direct number of IC 20. This begins the process for placing device 10 in communication with IC 20 and specifically with IC switch 34.

The clerk would next enter the amount of the transaction using keypad 28, pass the customer's credit card through slot 24, and then activate enter button 30. By the time enter button 30 is activated by the clerk, connection between device 10 and IC 20 would be already accomplished. This process not only saves the time required for the LEC to make a translation of the dialed number, but also reduces the transaction time perceived by the user of terminal 12 because connection with the IC is accomplished while the other tasks are performed.

When the sales clerk presses enter button 30, device 10 outputs the predetermined DTMF dialing string which preferably includes either the seven digit on-net number or the four digit speed dial number for destination 12. By so doing, IC 20 does not need to translate a dialed number and this transaction time is saved as well.

As those skilled in the art will appreciate, the user perception of call setup time is the time from when the last digit is dialed to connection with the destination. In prior art systems, call setup time averages about 7.75 seconds (6.4 to 9.1 seconds) from the time when the enter button is activated. Use of the present invention reduces the perceived call setup time to an average of about 1.5 seconds. As discussed above, this dramatic reduction occurs because LEC translation and IC translation times are eliminated, and because the LEC setup time between the terminal and the IC occurs while the sales clerk is entering the transaction amount and passing the credit card through card reader slot 24.

The present invention provides a method of establishing telecommunications between device 10 and the predetermined destination. The telecommunications network comprises a first network and a second network wherein the first network establishes communications between device 10 and a second network. It should be understood that while the first network is typically a local exchange network other networks are equally applicable to the present invention such as cellular or other networks. Further the second network is typically an interexchange network however other networks are equally applicable. In the method of the present invention, the device is configured to be activatable for transmitting a predetermined string associated with the second network, the device is activated to transmit the predetermined string and in response communication is established between the device and the second network. The second network then establishes communication between device 10 and said predetermined location. Typically, the device 10 also transmits a predetermined string associated with the predetermined destination. This transmission may occur with or subsequent to the transmission of the predetermined string associated with the second network. In response to receiving the predetermined destination string, the second network establishes communication over the network in accordance with the destination string received. Preferably the destination string and a switch in the second network routes the call without translating the destination string into another number.

Figure 2:
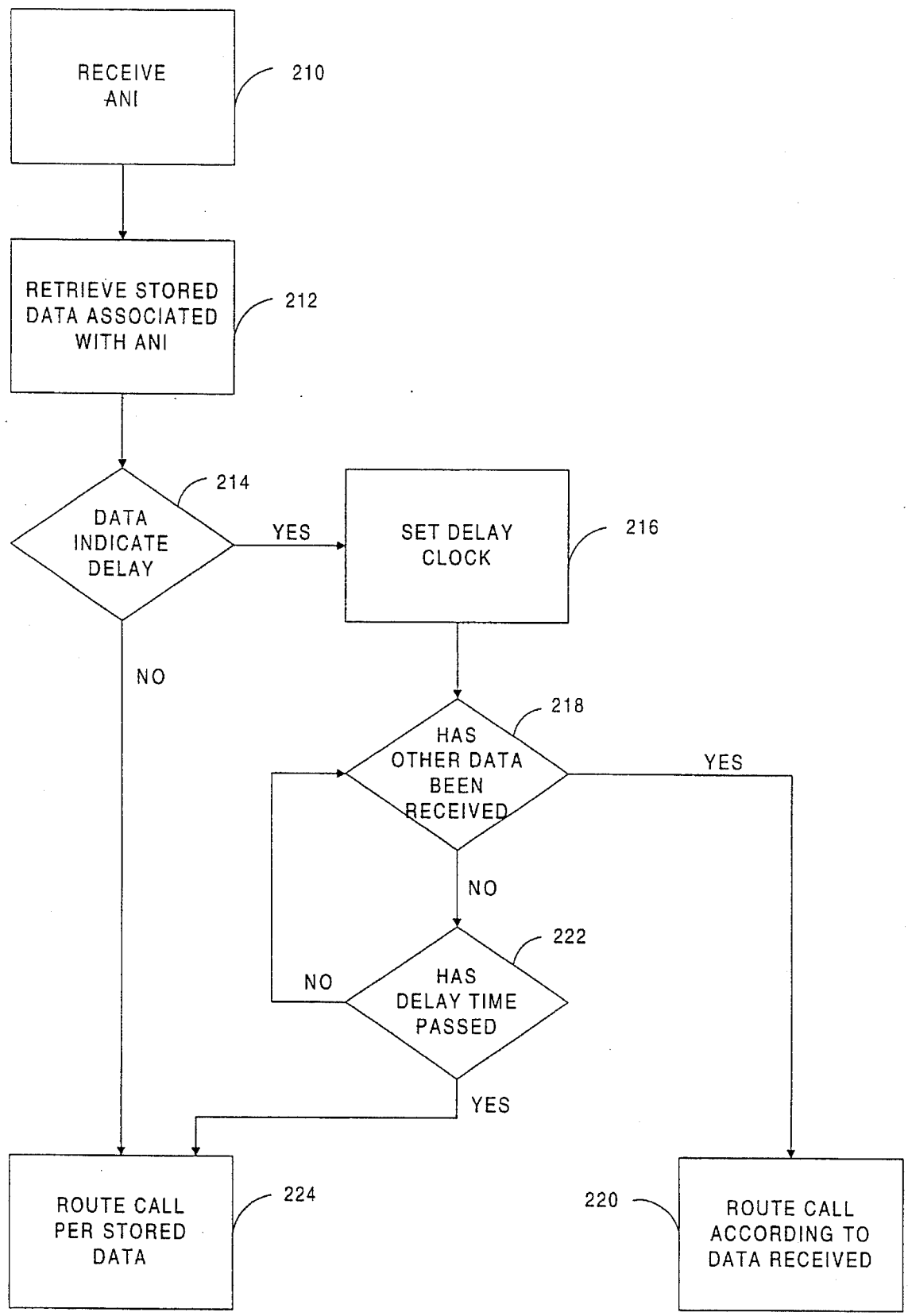
FIG. 2 is a depiction of one embodiment of a block diagram of the data flow in a telecommunications network.

The step of establishing communication by the second network may be performed through other advantageous methods. For example, device information may be received into the second network and in response, data is retrieved comprising a destination number previously stored in association with the device 10 information and then communication is established by the network in accordance with the retrieved destination number. This method can further reduce the call setup time. In a preferred embodiment an IC network switch 34 is programmed to recognize the calling number of the device 10 as a special or "hot" number. As is conventional, a local exchange carrier forwards the telephone number of a calling station, such as device 10, to the IC using automatic number identification (ANI) when a long distance call is placed. When IC switch 34 receives a call that was placed by dialing the cut through number, switch 34 then accesses a look-up table in local memory to determine whether the calling number is a special number indicating that the call is being placed from a device 10 requesting immediate connection, such as a credit card terminal. If so, switch 34 retrieves from memory the seven digit on-net number or the speed dial number of destination 12 and immediately routes the call to destination 12 without waiting for the sales clerk to activate enter button 30. In this way, destination 12 may already be in communication with device 10 before, as in the case of a credit card terminal, the clerk has activated enter button 30 or within about a second thereafter. It should be understood that the look-up table may store other data associated with said device or ANI. For example the table may indicate whether the hotline is to be invoked on an ANI basis, and when invoked whether the connection should be established immediately or it may indicate that a delay in the connection should occur. In the case of an immediate connection, the IC switch, such as a DMS-250 as supplied by Northern Telecommunications, would retrieve data corresponding to the received ANI from the table indicating that an immediate connection is to be established. In this case no dial tone will be returned by the switch and the switch will use the number contained in the look up table for immediate routing. Alternatively, the data in the table corresponding to the received ANI may indicate that a delay is to be established. In this case the switch will return dial tone and will anticipate that digits will be received from the communications device 10. If digits are received, the call will be routed in accordance with the received digits. Alternatively, if no digits are received from device 10 within a predetermined period of time, the switch will route the call in accordance with the stored data. FIG. 2 depicts one method for such a system. In block 210 the switch receives ANI associated with the calling number and in block 212 stored data is retrieved associated with the ANI. In decision block 214 the retrieved data is checked to determine if the data indicates a delay, if yes then as indicated in block 216 a delay clock is set. Once the delay clock has been set the decision block 218 checks to determine whether other data has been received indicating the desired destination of the call. If data has been received then as shown in block 220 the call is routed according to the data received. Alternatively if decision block 218 indicates that no data has been received then as shown in decision block 222 a check has been made whether the delay time has passed. If the delay time has not passed the flow is returned to block 218 to await additional data until the time has passed. Alternatively, if the delay time has passed without receiving additional data, then the call is routed in accordance with the stored data as per block 224. Returning to decision block 214, if the data indicates no delay the call is then immediately routed in accordance with the stored data per block 224. The provision for immediate connection based on the identification of device 10 provides numerous advantages. First as noted this can significantly reduce set-up time, this may provide a low cost alternative for direct access lines. For example, rather than having a dedicated direct access line, the present invention allows a user to use a device 10 in a regular mode such as a telephone and only have direct access when the carrier number is transmitted, or in other cases when no number is transmitted during the delay sequence. Alternatively, the device could be connected to a single dial-up line serving other dial-up telephone(s) or other such devices. For example, the present invention allows for a method of connecting multiple communication devices so as to be associated with a single number, such as single ANI. One device could be a credit card transaction terminal, utility monitoring device or a lottery device, or other such service, and the second device could provide regular phone service. This also provides a practical method to customers so as to not require dedicated lines for infrequently used devices. Further this method is usable to provide in essence direct access line type service without requiring that the customer be directly connected to the interexchange provider as can be obtained as a supplement to the users local service. In other applications this method is also advantageous, set up time for pay-phone transactions can be siginicantly decreased by cut through numbers and the use of hotline for quick connection to regional operating centers. Security systems or other applications may have a device which uses the users telephone line, with the user only paying for normal telecommunications service and the security system being charged for services in asociated with calls routed to its destination. It should be understood that the use of a network stored destination number is particularly advantageous as opposed to a destination number stored at each device and that the routing to a predetermined number is actually a destination number which may change. For example, should the predetermined destination number change, the network may change the destination number with comparative ease relative to entering and reprogramming each device 10. Further, since the destination number is not stored at each device 10, the end user or network may provide for different network routing options based on time of day or other conditions. As those skilled in the art will appreciate the present invention encompasses many variations in the preferred embodiment described herein. For example, the present invention is useful in connection with many different types of communication devices. For example these may used for utility monitoring devices, lottery machines, security card access, and security monitoring devices. For example for transaction card processing this may comprise transaction cards including credit cards, debit cards, charge cards, automatic teller cards and so forth. Additionally, the present invention finds utility when the telecommunications network includes only a local network. Such might occur, for example, if the validation computer is on-line with the local network. Further, the invention also encompasses the use with various other dial number plans, including any industry or global changes to the North America number plan.

Having thus described the preferred embodiment of the present invention, the following is claimed as new and desired to be secured by Letters Patent:

1. A telecommunications network comprising:
   a means for receiving information associated with an identification of a point-of-sale communication device;
   a means for accessing data comprising at least one destination number, wherein said data has been previously stored in association with the information received relating to the identification of said point-of-sale communication device; and
   means for establishing communications between said point-of-sale communication device and said destination using said destination number.

2. The network of claim 1, wherein said first means for receiving information comprises a means for receiving automatic number identification.

3. The network of claim 2, wherein said second means for accessing data comprises a switch having a table which stores the destination number in association with the identification of said communication device and retrieves the destination number based on the automatic number identification.

4. The network of claim 3, wherein said switch immediately routes to said destination associated with said destination number retrieved from said table based on said automatic number identification.

5. The network of claim 2, wherein said data further comprises delay information associated with said automatic number identification and said communication is established in accordance with said delay information.

6. A method of establishing telecommunications between a communication device and a destination by way of a telecommunications network, the network comprising a first network and a second network, wherein the first network establishes communications between the communications device and the second network, said method comprising the steps of;
   configuring the device for transmitting a predetermined string of digits associated with said second network in response to activation;
   activating the device to transmit said predetermined string of digits to the first network;
   establishing communication between the device and the second network in response to transmission of the predetermined string of digits, the communication being established by the first network without using a dedicated line;
   receiving information associated with an identity of the device into said second network from said first network, and responding to receipt of the information by retrieving data comprising a destination number stored in association with said identity information and comprising delay information associated with said device; and
   establishing communication initiated in the second network so as to complete said telecommunications from the device to the destination in accordance with said retrieved destination number and said delay information.

7. The method of claim 6 wherein said delay information indicates that the telecommunications should be established after a predetermined period of time has elapsed.

8. The method of claim 6 wherein said delay information indicates that the telecommunications should be immediately established.

9. A method of establishing telecommunications between a transaction card terminal communication device and a destination by way of a telecommunications network, the network comprising a first network and a second network, wherein the first network establishes communications between the transaction card terminal communications device and the second network, said method comprising the steps of:

configuring the transaction card terminal communications device for transmitting a predetermined string of digits associated with said second network in response to activation;

activating the transaction card terminal communications device to transmit said predetermined string of digits to the first network wherein said activation is in connection with a transaction involving use of a transaction card;

establishing communication between the transaction card terminal communications device and the second network in response to transmission of the predetermined string of digits, the communication being established by the first network without using a dedicated line;

receiving information associated with an identity of the transaction card terminal communications device into said second network from said first network, and responding to receipt of the information by retrieving data comprising a destination number stored in association with said identity information; and establishing communication initiated in the second network so as to complete said telecommunications from the transaction card terminal communications device to the destination in accordance with said retrieved destination number.

10. The method of claim 9 wherein said transaction card terminal communications device is activated in connection with a transaction involving the use of one of a credit card, debit card, charge card, and automatic teller called as said transaction card.

11. The method of claim 9 wherein said step of establishing communication initiated in the second network further comprises establishing communication with a validation computer as said destination.

12. A method of establishing telecommunications between one of at least two communications devices and a destination by using a telecommunications network comprised of a first network and a second network, wherein the devices have at least one associated telephone number and the second network has an associated pre-determined number, the method comprising the steps of:

connecting at least two of the devices so that they share the same telephone number;

configuring the devices to transmit the pre-determined number when activated;

activating a particular one of the devices and transmitting the pre-determined number to the first network;

establishing a first connection in the first network from the particular device to the second network using the predetermined number transmitted by the particular device;

receiving the telephone number in the second network from the first network;

retrieving a destination number associated with the telephone number from a database in the second network unless the destination number has been provided by the particular device; and establishing a second connection initiated in the second network from the first network to the destination using the destination number so as to complete the telecommunications from the particular device to the destination.

13. A method of establishing telecommunications between a communications device and a destination by using a telecommunications network comprised of a first network and a second network, wherein the device has an associated telephone number and the second network has an associated pre-determined number, the method comprising the steps of:

configuring the device to transmit the pre-determined number when activated;

activating the device and transmitting the pre-determined number to the first network;

establishing a first connection in the first network from the device to the second network using the pre-determined number transmitted by the device;

receiving the telephone number associated with the device in the second network from the first network;

retrieving a set of delay information associated with the telephone number from a database in the second network;

transmitting a user defined destination number from the device if the destination number is defined by a user of the device;

retrieving the destination number associated with the telephone number from the database in the second network if a time delay specified in the delay information expires before the user defined destination number is transmitted from the device; and establishing a second connection initiated in the second network from the first network to the destination using the destination number so as to complete the telecommunications from the device to the destination.

14. A method of establishing telecommunications between a communications device and a destination by using a telecommunications network comprised of a first network and a second network, wherein the device has an associated telephone number and the second network has an associated pre-determined number, the method comprising the steps of:

connecting the device with a telephone so that they share the telephone number;

configuring the device to transmit the pre-determined number when activated;

if the device is activated, then:
  (a) transmitting the pre-determined number to the first network;
  (b) establishing a first connection in the first network from the device to the second network using the pre-determined number transmitted by the device;
  (c) receiving the telephone number associated with the device in the second network from the first network;
  (d) retrieving a set of delay information associated with the telephone number from a database in the second network;
  (e) retrieving the destination number associated with the telephone number from the database in the second network if a time delay specified in the delay information expires; and
  (f) establishing a second connection initiated in the second network from the first network to the destination using the destination number so as to complete the telecommunications from the device to the destination; and if the telephone is activated using the pre-determined number, then:

(a) transmitting the pre-determined number to the first network;

(b) establishing a first connection in the first network from the telephone to the second network using the pre-determined number transmitted by the telephone;

(c) receiving the telephone number associated with the telephone in the second network from the first network;

(d) retrieving a set of delay information associated with the telephone number from a database in the second network;

(e) transmitting a user defined destination number from telephone if the destination number is defined by a user of the telephone; and (f) establishing a second connection initiated in the second network from the first network to the destination using the destination number so as to complete the telecommunications from the telephone to the destination if a time delay specified in the delay information does not expire before the user defined destination number is transmitted from the telephone.

15. A method of establishing telecommunications between a communications device and a destination by using a telecommunications network comprised of a first network and a second network, wherein the communications device has an associated telephone number and the second network has a cut-through number that identifies the second network without requiring a database look-up, the method comprising the steps of:

configuring the communications device to transmit the cut-through number when activated;

activating the communications device and transmitting the cut-through number to the first network;

establishing a first connection in the first network from the communications device to the second network using the cut-through number transmitted by the communications device;

receiving the telephone number of the communications device in the second network from the first network;

retrieving a destination number associated with the telephone number from a database in the second network; and establishing a second connection initiated in the second network from the first network to the destination using the destination number so as to complete the telecommunications from the communications device to the destination.

16. The method of claim 15, further including the step of connecting at least two of the devices so that they share the same telephone number.

17. A method of establishing telecommunications between a communications device and a destination by using a telecommunications network comprised of a first network and a second network, wherein the communications device has an associated telephone number, and wherein the second network has a cut-through number that identifies second network without requiring a database look-up, the method comprising the steps of:

configuring the communications device to transmit the cut-through number when activated;

activating the communications device and transmitting the cut-through number to the first network;

establishing a first connection in the first network from the communications device to the second network using the cut-through number transmitted by the communications device;

receiving the telephone number of the communications device in the second network from the first network;

retrieving delay information associated with the telephone number from a database in the second network; and establishing a second connection initiated in the second network from the first network to the destination using a destination number so as to complete the telecommunications from the communications device to the destination, wherein the destination number is defined by the communication device if the communications device transmits the destination number to the second network before expiration of a delay indicated by the delay information, and the destination number is defined by the database in the second network using the telephone number if the communications device does not transmit the destination number to the second network before expiration of the delay indicated by the delay information.

* * * * *